(12) United States Patent
Wright et al.

(10) Patent No.: US 9,860,012 B2
(45) Date of Patent: Jan. 2, 2018

(54) OPTICAL DATA TRANSMISSION

(71) Applicant: BRITISH TELECOMMUNICATIONS PUBLIC LIMITED COMPANY, London (GB)

(72) Inventors: Paul Daniel Wright, London (GB); Andrew Lord, London (GB); Michael Charles Parker, London (GB)

(73) Assignee: British Telecommunications Public Limited Company, London (GB)

(*) Notice: Subject to any disclaimer, the term of this patent is extended or adjusted under 35 U.S.C. 154(b) by 0 days.

(21) Appl. No.: 14/786,399

(22) PCT Filed: Apr. 24, 2014

(86) PCT No.: PCT/GB2014/000155
§ 371 (c)(1),
(2) Date: Oct. 22, 2015

(87) PCT Pub. No.: WO2014/174234
PCT Pub. Date: Oct. 30, 2014

(65) Prior Publication Data
US 2016/0072608 A1    Mar. 10, 2016

(30) Foreign Application Priority Data
Apr. 24, 2013 (EP) .................... 13250053

(51) Int. Cl.
*H04J 14/02* (2006.01)
*H04L 12/733* (2013.01)
*H04Q 11/00* (2006.01)

(52) U.S. Cl.
CPC ...... *H04J 14/0241* (2013.01); *H04J 14/0213* (2013.01); *H04L 45/122* (2013.01);
(Continued)

(58) Field of Classification Search
USPC ........................................... 398/49
See application file for complete search history.

(56) References Cited

U.S. PATENT DOCUMENTS

| 3,259,693 A | 7/1966 | Watanabe |
| 4,731,878 A | 3/1988 | Vaidya |
(Continued)

FOREIGN PATENT DOCUMENTS

| CN | 1802808 A | 7/2006 |
| EP | 1278325 A2 | 1/2003 |
(Continued)

OTHER PUBLICATIONS

Amaya (NPL Doc.—Introducing Node Architecture Flexibility for Elastic Optical Networks—Norberto Amaya—vol. 5, No. 6/Jun. 2013/J. Opt. Commun. Netw. 593 (pp. 597-604).*
(Continued)

*Primary Examiner* — David Payne
*Assistant Examiner* — Omar S Ismail
(74) *Attorney, Agent, or Firm* — Amy M. Salmela; Patterson Thuente Pederson, P.A.

(57) ABSTRACT

A routing and wavelength assignment method for use in an optical fiber system, comprising: (i) identifying a plurality of paths between a source node and a destination node, (ii) selecting one of the plurality of identified paths, (iii) defining within the spectrum band of the selected path one or more blocks of spectral resource, in which each block comprises either: one or more unused wavelength channels, or one or more wavelength channels having the same spectral width, (iv) obtaining an entropy value of the selected path defining the spectrum fragmentation across its spectrum band, based on a logarithm of the ratio of the number of wavelength channels in each of the one or more blocks, to the total number of wavelength channels across the spectrum band,
(Continued)

(v) iterating (ii) to (v) until the entropy value of each of the plurality of identified paths has been determined, and (vi) choosing from the plurality of identified paths a path having the lowest entropy value.

9 Claims, 7 Drawing Sheets

(52) U.S. Cl.
CPC . *H04Q 11/0066* (2013.01); *H04Q 2011/0016* (2013.01); *H04Q 2011/0086* (2013.01)

(56) References Cited

U.S. PATENT DOCUMENTS

| | | |
|---|---|---|
| 5,586,128 A | 12/1996 | Chen |
| 6,476,945 B1 | 11/2002 | Archambault |
| 6,738,354 B1 | 5/2004 | Ashwood Smith |
| 6,763,190 B2 | 7/2004 | Agrawal et al. |
| 6,775,230 B1 | 8/2004 | Watanabe et al. |
| 6,850,705 B2 | 2/2005 | Su et al. |
| 7,113,481 B2 | 9/2006 | Elie-Dit-Cosaque et al. |
| 7,171,124 B2 | 1/2007 | Smith et al. |
| 7,224,897 B1 | 5/2007 | Slezak et al. |
| 7,249,169 B2 | 7/2007 | Blouin et al. |
| 7,283,741 B2 | 10/2007 | Sadananda |
| 7,289,730 B2 | 10/2007 | Matsuura et al. |
| 7,539,210 B2 | 5/2009 | Iovanna et al. |
| 7,599,621 B2 | 10/2009 | Guy et al. |
| 7,725,035 B2 | 5/2010 | Tyan et al. |
| 7,734,175 B2 | 6/2010 | Amemlya |
| 7,843,823 B2 | 11/2010 | Lev-Ran |
| 8,666,247 B2 | 3/2014 | Srinivasan |
| 8,948,048 B2 | 2/2015 | Gerber |
| 8,954,562 B2 | 2/2015 | Vicente |
| 9,020,350 B2 | 4/2015 | Sullivan |
| 9,166,723 B2 | 10/2015 | Patel |
| 2002/0030867 A1 | 3/2002 | Iannone et al. |
| 2002/0093703 A1 | 7/2002 | Maeno |
| 2002/0145783 A1 | 10/2002 | Chang et al. |
| 2002/0191247 A1 | 12/2002 | Lu et al. |
| 2003/0007211 A1 | 1/2003 | Gummalla |
| 2003/0007212 A1 | 1/2003 | Sala |
| 2003/0016414 A1 | 1/2003 | Solheim et al. |
| 2003/0030866 A1 | 2/2003 | Yoo |
| 2003/0043427 A1 | 3/2003 | Robidas |
| 2003/0072052 A1 | 4/2003 | Graves |
| 2003/0161632 A1 | 8/2003 | Wang |
| 2003/0198227 A1 | 10/2003 | Matsuura et al. |
| 2004/0022194 A1 | 2/2004 | Ricciulli |
| 2004/0120705 A1 | 6/2004 | Friskney et al. |
| 2004/0208504 A1 | 10/2004 | Solheim et al. |
| 2004/0220886 A1 | 11/2004 | Kumaran et al. |
| 2004/0234264 A1 | 11/2004 | Sasaki |
| 2004/0246896 A1 | 12/2004 | Hoang et al. |
| 2004/0246912 A1 | 12/2004 | Hoang et al. |
| 2004/0246973 A1 | 12/2004 | Hoang et al. |
| 2004/0258409 A1 | 12/2004 | Sadananda |
| 2005/0008367 A1 | 1/2005 | Laalaoua |
| 2005/0069314 A1 | 3/2005 | De Patre et al. |
| 2005/0069316 A1 | 3/2005 | Vigoureux et al. |
| 2006/0002716 A1 | 1/2006 | Guy et al. |
| 2006/0188252 A1 | 8/2006 | Schluter |
| 2007/0195700 A1 | 8/2007 | Katoh et al. |
| 2007/0280686 A1 | 12/2007 | Amemlya |
| 2008/0037982 A1 | 2/2008 | Niven-Jenkins et al. |
| 2008/0056717 A1 | 3/2008 | Niven-Jenkins et al. |
| 2009/0060505 A1 | 3/2009 | Bernstein et al. |
| 2011/0262128 A1 | 10/2011 | Madrahalli |
| 2011/0274101 A1 | 11/2011 | Cooper |
| 2012/0051745 A1 | 3/2012 | Srinivasan |
| 2012/0070148 A1* | 3/2012 | Patel ................... H04J 14/0224 398/49 |
| 2012/0155319 A1 | 6/2012 | Gerber |
| 2012/0201541 A1* | 8/2012 | Patel ................... H04J 14/0212 398/58 |
| 2012/0251117 A1 | 10/2012 | Patel |
| 2012/0294610 A1 | 11/2012 | Genthner |
| 2012/0315045 A1 | 12/2012 | Spector |
| 2012/0327953 A1* | 12/2012 | Vokkarane .......... H04J 14/0267 370/442 |
| 2012/0328286 A1 | 12/2012 | Wang |
| 2012/0328296 A1 | 12/2012 | Sullivan |
| 2013/0033994 A1 | 2/2013 | Parekh |
| 2013/0266316 A1 | 10/2013 | Xia |
| 2013/0272710 A1 | 10/2013 | Wang |
| 2013/0272711 A1 | 10/2013 | Patel |
| 2014/0016939 A1 | 1/2014 | Patel |
| 2014/0029939 A1 | 1/2014 | Patel |
| 2014/0226985 A1 | 8/2014 | Patel |
| 2014/0226986 A1 | 8/2014 | Patel |
| 2014/0334817 A1 | 11/2014 | Miedema |
| 2015/0104166 A1 | 4/2015 | Patel |
| 2015/0249462 A1 | 9/2015 | Chang |
| 2016/0072608 A1 | 3/2016 | Wright |
| 2016/0211916 A1 | 7/2016 | Yang |
| 2016/0241353 A1 | 8/2016 | Wright |

FOREIGN PATENT DOCUMENTS

| | | |
|---|---|---|
| EP | 1499054 A2 | 1/2005 |
| EP | 2403169 A1 | 1/2012 |
| EP | 2797247 A1 | 10/2014 |
| JP | 2002064259 A | 2/2002 |
| WO | WO03079596 A1 | 9/2003 |
| WO | WO04002078 A1 | 12/2003 |

OTHER PUBLICATIONS

Wang (NPL Doc.—Utilization Entropy for Assessing Resource Fragmentation in Optical Networks—OFC/NFOEC Technical Digest © 2012 OSA.*
Bagchi, "Route Selection with Multiple Metrics", Information Processing Letter, Amsterdam, vol. 64, No. 4, Nov. 1997, pp. 203-205, XP000669933.
International Search Report dated Aug. 18, 2005, International Application No. GB2005/002728, 2 pages.
Japanese Office Action dated Apr. 21, 2010, Japanese Application No. 2007-522008, 2 pages.
Japanese Office Action dated Oct. 1, 2010, Japanese Application No. 2007-522008, 2 pages.
International Search Report, PCT Application No. PCT/GB2005/002736, dated Oct. 21, 2005.
P. Wright et al., "Simulation Results of Shannon Entropy Based Flexgrid Routing and Spectrum Assignment on a Real Network Topolgoy", 39*th* European Conference and Exhibition on Optical Communication (Econ 2013), Sep. 22, 2013, pp. 465-467.
Xi Wang et al., "Utilization Entropy for Assessing Resource Fragmentation in Optical Networks", Optical Fiber Communication Conference and Exposition, 2012 and the National Fiber Optic Engineers Conference, IEEE, Mar. 4, 2012 pp. 1-3.
Norberto Amaya et al., "Introducing Node Architecture Flexibility for Elastic Optical Networks," IEEE, Journal of Optical Communications and Networking, vol. 5, No. 6, Jun. 1, 2013, pp. 593-608.
Klinkowski, Miroslaw et al., "Elastic Spectrum Allocation for Time-Varying Traffic in FlexGrid Optical Networks", IEEE, Journal on Selected Area in Communications, vol. 31, No. 1, Jan. 1, 2013, pp. 26-38.
Gerstel, Ori et al., "Elastic Optical Networking: A new Dawn for the Optical Layer?", IEEE, vol. 50, No. 2, Feb. 1, 2012, pp. s12-s20.
International Search Report, International Application No. PCT/GB2014/000404, dated Dec. 11, 2014, 3 pages.
Application and File History for U.S. Appl. No. 15/028,530, filed Apr. 11, 2016. Inventors: Wright et al.
Application and File History for U.S. Appl. No. 11/632,531, filed Jan. 17, 2007. Inventors: Niven-Jenkins et al.
Application and File History for U.S. Appl. No. 11/632,533, filed Jan. 17, 2007. Inventors: Niven-Jenkins et al.

(56) References Cited

OTHER PUBLICATIONS

International Search Report, PCT Application No. PCT/GB2014/000155, dated Jun. 11, 2014, 2 pages.
M. Zhang et al., *Planning and Provisioning of Elastic O-OFDM Networks with Fragmentation-Aware Routing and Spectrum Assignment (RSA) Algorithms*, Asia Communications and Photonics Conference, OSA Technical Digest, Optical Society of America 2012, 3 pages.
T. Takagi et al., *Dynamic Routing and Frequency Slot Assignment for Elastic Optical Path Networks that Adopt Distance Adaptive Modulation*, Optical Fiber Communication Conference/National Fiber Optic Engineers Conference 2011, OSA Technical Digest (CD), Optical Society of America, Mar. 2011.
W. Xi et al, *Utilization Entropy for Assessing Resource Fragmentation in Optical Networks*, Optical Fiber Communication Conference, OSA Technical Digest, Optical Society of America, 2012.
Zhang et al., "A Survey on OFDM-Based Elastic Core Optical Networking", available at http://ieeexplore.ieee.org/stamp/stamp.jsp?arnumber=6148192, IEEE Communications Surveys & Tutorials, vol. 15, No. 1, First Quarter 2013, pp. 65-87.
Patel, Ankitkumar N. et al., "Defragmentation of Transparent Flexible Optical WDM (FWDM) Networks" Patel et al., available at http://ieeexplore.ieee.org/stamp/stamp.jsp?arnumber=5875583, Optical Society of America, (c) 2011, 3 pages.
Geisler, David J., "Demonstration of Spectral Defragmentation in Flexible Bandwidth Optical Networking by FWM", available at http://ieeexplore.ieee.org/stamp/stamp.jsp?arnumber=6044702, IEEE Photonics Technology Letters, vol. 23, No. 24, Dec. 15, 2011, pp. 1893-1895.
Wen Ke, "Dynamic On-demand Lightpath Provisioning Using Spectral Defragmentation in Flexible Bandwidth Networks" available at http://ieeexplore.ieee.org/stamp/stamp.jsp?arnumber=6065854, ECOC Technical Digest (c) 2011 OSA, 3 pages.
Chinese Office Action and Search Report, Application No. 201480036141.7, dated Jul. 17, 2017, 8 pages (15 pages with translation).

\* cited by examiner

| | f1 | f2 | f3 | f4 | f5 | f6 | f7 | f8 | f9 | f10 | f11 | f12 | f13 | f14 | f15 | f16 |
|---|---|---|---|---|---|---|---|---|---|---|---|---|---|---|---|---|
| ΔHfrag(S1) | ∞ | ∞ | ∞ | -0.141 | -0.141 | ∞ | ∞ | -0.260 | ∞ | ∞ | -0.141 | -0.141 | ∞ | ∞ | ∞ | ∞ |
| ΔHfrag(S2) | ∞ | ∞ | -0.087 | 0.000 | -0.087 | ∞ | ∞ | -0.260 | ∞ | ∞ | -0.087 | 0.000 | -0.087 | ∞ | ∞ | ∞ |
| ΔHfrag(S3) | ∞ | ∞ | -0.087 | 0.000 | -0.087 | ∞ | ∞ | -0.260 | ∞ | ∞ | -0.087 | 0.000 | -0.087 | ∞ | ∞ | ∞ |
| ΔHfrag(S4) | ∞ | ∞ | ∞ | ∞ | -0.260 | ∞ | ∞ | 0.038 | 0.217 | 0.300 | 0.337 | 0.337 | 0.300 | 0.217 | 0.038 | ∞ |
| Sum(ΔHfrag) | ∞ | ∞ | ∞ | ∞ | -0.574 | ∞ | ∞ | -0.742 | ∞ | ∞ | 0.023 | 0.196 | ∞ | ∞ | ∞ | ∞ |
FIGURE 8(a)
| | f1 | f2 | f3 | f4 | f5 | f6 | f7 | f8 | f9 | f10 | f11 | f12 | f13 | f14 | f15 | f16 |
|---|---|---|---|---|---|---|---|---|---|---|---|---|---|---|---|---|
| ΔHfrag (S1+S2+S3+S4) | ∞ | ∞ | ∞ | ∞ | -0.311 | ∞ | ∞ | -0.311 | ∞ | ∞ | 0.141 | 0.141 | ∞ | ∞ | ∞ | ∞ |
FIGURE 8(b)
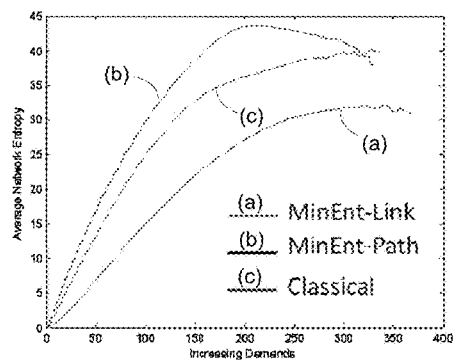
FIGURE 9
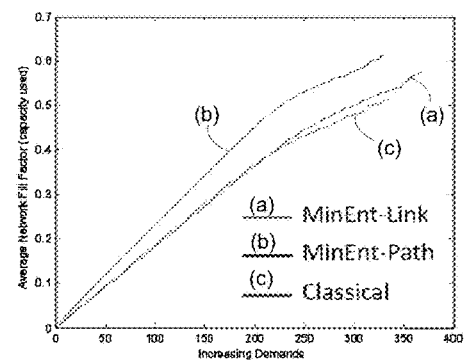
FIGURE 10

OPTICAL DATA TRANSMISSION

RELATED APPLICATIONS

The present application is a National Phase entry of PCT Application No. PCT/GB2014/000155, filed Apr. 24, 2014, which claims the benefit of EP Application No. 13250053.9 filed Apr. 24, 2013, each of which is incorporated herein by reference in its entirety.

TECHNICAL FIELD

Embodiments relate to apparatus, systems and methods relating to optical data transmission, particularly but not exclusively in respect of optimizing the use of optical spectrum resource in a telecommunications network.

BACKGROUND

The way optical networks are used is undergoing significant change, driven in part by the huge growth of traffic such as multimedia services and by the increased uncertainty in predicting the sources of this traffic due to the ever changing models of content providers over the Internet. Sophisticated modulation schemes for higher bandwidth 100 Gb/s services and beyond are known and come into commercial use in optical networks of large and increasing link and node numbers.

A bottleneck to widespread deployment of such schemes is the "fixed" wavelength grid approach specified by the International Telecommunication Union (ITU), in which the relevant optical spectrum range in the C-band is divided into fixed-sized spectrum slots. As used herein, a "slot", "wavelength" or "channel" is defined as a wavelength or a spectrum of wavelengths associated with a certain signal size. A connection is made by assigning spectral (i.e. wavelength) slots on the optical links comprising the path between source and destination. A problem arises with bit rates greater than 100 Gb/s, which occupy spectral widths too broad to fit into such fixed-sized spectrum slots or channels; forcing to fit by adopting higher spectral-efficiency modulation methods which tend to compromise transmission distances. It seems clear that this decade-old ITU "fixed grid" approach will not work for bit rates significantly greater than 100 Gb/s (e.g. 400 Gb/s and above), highlighting the need for a more flexible approach to be developed. Work on such a new "elastic optical networking" approach is underway, based on a "flexgrid" WDM (wavelength division multiplexing) approach, in which the optical spectrum can be divided up in a way to form spectral slots of arbitrary widths which are selectable depending on, e.g., the bit rates being used, tailored to the requirements of the optical transceiver and accommodating new bit rate services.

Representations of the fixed and flexible grid approaches are depicted in the example graphs shown in FIG. 1, in which graphs (a), (c) and (d) depict examples of fixed grid implementations, while (b) and (e) illustrate the flexgrid approach. Graph (a) illustrates the strict guard bands partitioning adjoining optical channels in a fixed grid implementation, and demands or wavelengths at a particular bit rate. Graph (b) shows how the channels for the demand can be grouped into a single "superchannel" which can be transported as one entity in a flexgrid system. In graph (c), five demands (of varying bit rates and distances) and their spectrum needs are shown on a fixed grid, assuming quaternary phase shift keying (QPSK) modulation. Graph (d) depicts the same service demands of graph (c), with adaptive modulation optimized for the required bit rate and reach. Arbitrary-size spectrum slot allocation is shown in the flexgrid implementation of graph (e) which has the same demands as graphs (c) and (d).

In brief, there is typically only one way in fixed grid networks to implement a given demand as the wavelength bit rate, optical reach, and spectrum parameters are highly constrained in their allowable implementation solutions so as to ultimately align with the fixed grid architecture. This means that the demand can occupy less than a full slot resulting in wasted spectrum capacity like that shown in graph (c). On the other hand, a superchannel width wider than the fixed slot width as illustrated in (b) cannot be accommodated in a fixed grid network. In the flexgrid scheme, a choice can be made when implementing a demand, by assigning a modulation format that gives sufficient performance to reach the required distance, while relaxing the requirements on the actual width of the spectral bandwidth occupied by the optical path. The spectrum savings that may be achieved using a flexgrid approach may be seen by a comparison between the fixed grid scheme shown in (d) and an identical scenario when used under the flexgrid scheme shown in (e). In other words, moving away from the use of fixed-position guard bands defining channel widths in the fixed grid approach, can achieve efficiencies by spacing channels contiguously or at least closer to each other, across the spectrum. This can result in the freeing up of spectrum resource for other demands. In this way, the flexgrid scheme allows greater flexibility and choice in allocating spectrum.

A drawback suffered particularly by flexgrid systems, however, is that the optical spectrum can become "fragmented", consisting of non-contiguous used spectrum sections in a manner akin to a computer hard disk including fragmented disk blocks. This is because when a signal or demand reaches its destination node, the optical connection terminates and the wavelength or channel "vacates" the spectrum slot. One way of preventing spectrum fragmentation is to find a new resource request having an identical or near-identical slot width, to occupy that slot just at the point when the slot becomes available. The chances of such coincidences occurring are, however, not high, and as may be expected, such vacated slots are likely to remain wholly or partly unfilled. In other words, even if a wavelength channel is found which is capable of fitting into the vacated slot, this is likely to be narrower in width to the previous wavelength channel, resulting in the creation of unused sections of the spectrum so that the level of fragmentation tends to increase over time. The state in which a spectrum comprises non-contiguous used or unused sections results in a state of "entropy" (randomness or disorder). Matters become especially problematic when the unused spectrum parts are so narrowly splintered that they cannot be used to accommodate a demand, even when the total (summed) amount of actual unused spectrum might otherwise have been usable. By way of illustration, graph (e) of FIG. 1 depicts an optimal situation in a flexgrid environment, in which the demands essentially occupy contiguous positions in the spectrum. In a less ideal case, fragments of unused "stranded" spectrum fragments can be represented as gaps between neighboring used slots, as shown in, e.g., FIG. 3 (discussed below). It can be expected that failure to address this problem may eventually result in significant inefficiencies in the use of the precious spectrum resource, possibly resulting in the need to build expensive new links to cope with traffic levels.

As might be expected, this is much less of a problem in fixed grid systems owing to the standardized slot size arranged contiguously to each other. Indeed, splintering of the spectrum is simply not an issue in a fixed grid system, since all slots are of the same standard size, such that when a channel is terminated and frees up spectral space, then any new demand that arises will automatically be of the same (standardized) width to fit into the available slot.

There is therefore a need to address the above issues, especially in connection with the routing of optical data traffic in flexgrid implementations in the elastic optical networking paradigm.

Some approaches referring to an entropy measure along optical links are known. For example, "Utilization Entropy for Assessing Resource Fragmentation in Optical Networks" (W. Xi et al., Optical Fiber Communication Conference, OSA Technical Digest (Optical Society of America, 2012)) discusses spectral fragmentation using qualitative and algorithmic descriptions, which as an approach may not provide a predictive measure of the overall spectral fragmentation. This is because algorithmic approaches often implies a degree of non-linearity (e.g. the presence of binary logic steps, i.e. XOR, OR, AND operations etc.), which may cause non-monotonic (and/or non-linear) behavior of the output result of the algorithm. Nor does an algorithm necessarily offer the degree of 'sensitivity' or ability to distinguish between subtle differences of fragmentation—it depends on the construction of the algorithm, and its quantitative behavior. Methods based on this approach might not be sufficiently reliable for deployment in the field.

Another document titled "Planning and Provisioning of Elastic O-OFDM Networks with Fragmentation-Aware Routing and Spectrum Assignment (RSA) Algorithms" (M. Zhang et al., Asia Communications and Photonics Conference, OSA Technical Digest (online) (Optical Society of America, 2012)) describes a fragmentation-aware RSA, which uses a fragmentation ratio when making resource allocations. It does not however use an entropy-based metric for choosing routes, and the paper explicitly notes that the utilization entropy approach of the W. Xi document above does not sufficiently quantify bandwidth fragmentation to be helpful.

"Dynamic Routing and Frequency Slot Assignment for Elastic Optical Path Networks that Adopt Distance Adaptive Modulation" (T. Takagi et al., Optical Fiber Communication Conference/National Fiber Optic Engineers Conference 2011, OSA Technical Digest (CD) (Optical Society of America, 2011)) describes a classical style RSA applied to elastic networks and does not take into account spectrum entropy.

As such, the idea of assessing resource fragmentation and fragmentation-aware routing are known, as is the application of entropic concepts in the area of optical fiber spectrum. However, a stochastically well-ordered study of optical networking on statistical mechanical principals using information-theoretic definitions of entropy has not yet been known to have been conducted in connection with optical networks, whose size with their ever-larger link and node numbers, and featuring an ever-increasingly exploitable optical spectrum (atomized to an ever-smaller quantum, 100 GHz→6.25 GHz) now makes them particularly amenable to such statistical mechanical (thermodynamical) analyses. In particular, there is currently no known approach which allows calculation of an entropy measure in manner which is essentially quantitative in behavior, (i.e. it can be expressed as a compact mathematical equation) which has highly predictive behavior, is monotonic as a measure of entropy, and can sensitively distinguish between arbitrarily fine differences of fragmentation. There is also no method allowing for such a measure to be used in an optical path routing choice in a manner which allows overall network resource (i.e., utilization of overall network capacity) to be more greatly exploited before overall networking blocking probabilities start exceeding certain thresholds (e.g. at 5%). In particular, it would be useful to reduce or stop the spectrum becoming fragmented in the first place. With the aim of full and efficient use of the spectrum resource, network operators would wish to have tools to address the above problems.

SUMMARY

According to a first aspect, there is provided a routing and wavelength assignment method for use in an optical system, comprising:
(i) in an optical path between a source node and a destination node, selecting a block of spectrum resource comprising one or more adjacent wavelength channels, the block being of a width sufficient accommodate a demand having a spectral width occupying one or more adjacent wavelength channels, and
(ii) determining an entropy value of the spectrum entropy level of the selected block based on a logarithm of the ratio of the number of wavelength channels in the block, to the total number of wavelength channels across the spectrum band of the optical path.

A path can comprise an optical link between neighboring nodes, or an end-to-end optical path between source and destination nodes which are not neighboring nodes. The calculation of the spectrum fragmentation (or entropy) levels can be expressed as a value for such a link or end-to end-path, which usefully allows for a comparison to be made between paths having different entropy values, where a number of potential paths are available on the path are available. This enables a user such as a network operator to choose to admit demands selectively, based e.g. on a policy of minimizing spectrum entropy.

A block of spectrum resource can, as will be discussed below, comprise one or more wavelength channels (also referred to as "slots" herein).

As discussed below, Routing and Wavelength Assignment (RWA) and/or Routing and Spectrum Assignment (RSA) are well known and used in making routing decisions. In their application in the impending elastic optical networking paradigm, issues arising as a result of spectrum fragmentation will need to be taken into account. The quantitative approach described here makes use of the logarithmic Shannon information entropy approach which advantageously yields predictive results, is monotonic as a measure of entropy, and can sensitively distinguish between arbitrarily fine differences of fragmentation.

According to another aspect, there is provided a processor enabling routing and wavelength assignment decisions in an optical fiber system configured to determine an entropy value of the spectrum entropy level of the selected block based on a logarithm of the ratio of the number of wavelength channels in the block, to the total number of wavelength channels across the spectrum band of the optical path.

In a further aspect, there is provided a network management system enabling routing and wavelength assignment decisions configured to:
(i) in an optical path between a source node and a destination node, select a block of spectrum resource comprising one or more adjacent wavelength channels, the block being of a width sufficient accommodate a demand having a spectral width occupying one or more adjacent wavelength channels, and (ii) determine an entropy value of the spectrum entropy level of the selected block based on a logarithm of the ratio of the number of wavelength channels in the block, to the total number of wavelength channels across the spectrum band of the optical path.

BRIEF DESCRIPTION OF THE DRAWINGS

Systems, methods and apparatus of embodiments will now be described by way of example only, with reference to the following drawings, wherein:

FIGS. 8(a) and 8(b) respectively depict the link-based and path-based entropy assessment approaches.

FIG. 9 is a graph depicting the evolution of a network in spectrum entropic terms.

FIG. 10 is a graph depicting the evolution of a network in terms of utilization.

DETAILED DESCRIPTION

Figure 1:
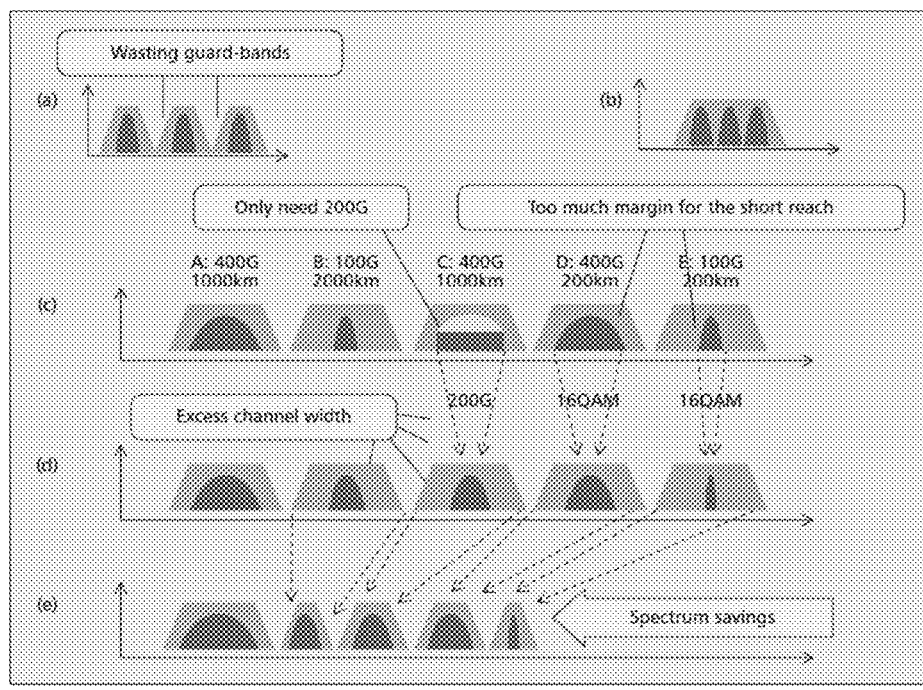
FIG. 1 illustrates spectrum assignment in fixed grid and flexgrid scenarios.

As discussed above, FIG. 1 illustrates the differences in the fixed grid and flexgrid paradigms, and a comparison of graphs (d) (depicting fixed grid spectrum use) and graph (e) (flexgrid) highlights the spectrum savings that can be achieved using flexgrid.

The techniques and apparatus described herein are largely directed to use of the invention in flexgrid networks given the inherent likelihood of fragmentation when slots are vacated in the manner described above. As will, however, be explained below, it is also possible to use them to advantage in fixed grid scenarios.

Fragmentation Entropy Metric

The following describes how a usable entropy metric can be calculated for any system with suitable characteristics. A worked example is also discussed in connection with FIGS. 3 to 5, to demonstrate an application of an entropy metric in the specific context of fragmentable optical spectrum resources. The fragmentation entropy metric or measure obtained using the method described herein, takes into account distinguishable minimum-entropy states and degrees of freedom in multi-granular/wavelength link traffic demands. The method takes from the Shannon theory of information, and is based on the Boltzmann approach of countable and distinguishable states. The result is monotonic and scale-less, and discriminates varying spectrum topological complexity for efficient resource management.

Generally speaking, a system can exist in N different "states" (as will be described in more detail below), wherein the probability of existing in the $i^{th}$ state is $p_i$. As known from Shannon information theory, the entropy H of the system is generally given by $H=-\Sigma_{i=1}^{N} p_i \ln p_i$, where $\Sigma_{i=1} p_i = 1$.

In measuring the fragmentation of a system's resource, two points of interest are:

(i) whether a particular resource of the system is being used; and (ii) the relative location of that resource, in particular whether neighboring resources to it are being used.

Figure 2:
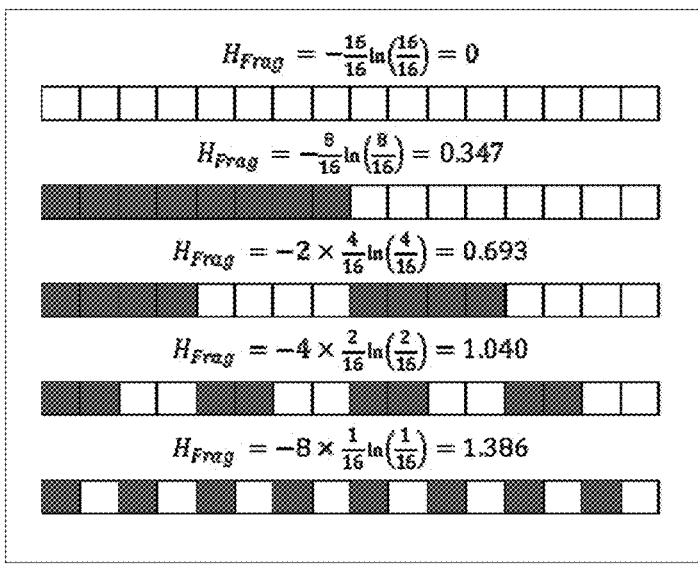
FIG. 2 depicts spectra of different entropy fragmentation levels.

Referring to FIG. 2, the first (top-most) and last (bottom-most) spectra depict respectively the least and the most fragmented versions of the resource (in which empty boxes depict unfilled slots and black boxes depicted filled slots). From a practical point of view, when a section of resource is being used contiguously (i.e. no gaps in between), how the different contiguous chunks of resource are arranged within the overall section of contiguous space is not relevant. The first-order requirement is that the resource be as unfragmented as possible. As may be expected, management of a complex topology comprising a puzzle of interstitially-inserted resources (such as the last-depicted spectrum in FIG. 2) is more problematic than in a less fragmented system. As noted above in the case of an optical network, resource fragmentation is created when, e.g., a demand or requirement previously in use is removed from the system, which is likely to worsen over time if left unchecked, particular in flexgrid implementations. An appropriate tool will be required to assess the relative topological complexity and/or fragmentation of the resource utilization from time to time or on an ongoing basis. Maintenance in the form of, e.g., spectrum re-ordering and re-allocation (akin to a "defragmentation" of a computer hard disk) will have to be carried out to ensure efficient use of the available spectrum resource. This is potentially costly and disruptive as operations have to be temporarily halted while the spectrum defragmentation takes place. Having an entropic measure or metric will allow the network owner or operator to take informed decisions about when and how to undergo such maintenance, or test and diagnosis.

In calculating such a metric, a start point is the fill-factor f, which has a value lying between 0 and 1. The fill-factor f indicates the fraction of the optical spectrum being consumed by the total number of data channels present. For a fully unfragmented spectrum, where the different permutations/combinations of the occupied spectrum are essentially indistinguishable from each other, the entropy of the system is given by:

$$H_{min}(f) = -f \ln f - (1-f)\ln(1-f) \quad (1)$$

By definition, an unfragmented system comprises two sections, one of which is completely occupied and the other is completely unoccupied, so that a portion of optical spectrum exists in only N=2 different states. The probability that any resource quantum of the optical spectrum exists in the completely occupied or filled state is $p_1=f$, and the probability of existing in the completely unoccupied or unfilled state is $p_2=1-f$. The fragmentation entropy of this unfragmented spectral case is referred to as $H_{min}$, since it represents the lower bound of the system fragmentation entropy for any given fill-factor f. The shape of $H_{min}$ as a function off is the well-known symmetrical curve (even about f=0.5 where it reaches its maximum of 0.693) which is zero at f=0 and f=1.

A fragmented spectrum, on the other hand, comprises separated chunks of used or unused optical resource each of which represents different states or blocks of the system.

The states or blocks of the system are defined by considering the optical spectrum to be represented by a set of N different number of blocks of spectral resource. Each state or block consists of either a single wavelength or data channel, or a contiguous set of multiple data channels but each of the same kind and spectral width, e.g. all 10G, 40G, or 100G, etc. Referring briefly to the example shown in FIG. 3, there are a total of N=11 states or blocks, in which state 1 comprises one 10G channel, while state 5 comprises two 40G channels. The spectral width of the $i^{th}$ block is given by $C_i$, assumed to be an integer multiple of a minimum spectral resource quantum q, e.g. q=6.25 GHz. A block of resource can therefore also represent either a single or a contiguous set of unused optical spectrum quanta (see states 2 and 4 respectively, in FIG. 3); in which case the single (or repeated) channel is of unit spectral width q.

Because a block comprises either one single channel, or contiguous identical data channels, each block represents a maximally unfragmented (minimum entropy, MinEnt, or minimum topological complexity) sub-domain of the overall optical spectrum. This is because the position occupied by any one of the channels within a particular block is irrelevant to the entropy measure of the block, so that the entropy of the block itself can be thought of as a constant. Accordingly, swapping or shuffling channels within a block offers no advantage or difference in terms of optimal exploitation of the overall spectral resource.

The total (i.e. filled+unfilled) spectrum resource within an optical fiber is assumed to be Pq, i.e. there are a total of P spectral quanta of total resource.

In calculating the entropy measure, the next important abstraction is to consider each individual data channel (10G, 40G, 100G, etc.) as well as each unfilled quantum q, to represent a single "degree of freedom" (DoF) of the system, which is independent of the actual spectral width that each DoF represents. A DoF can be of varying spectral width, in the same way as a block or state. As noted above, a state or block can comprise more than one channel or unused section(s) of spectrum, so referring again to FIG. 3, there are 2 DoFs in each of e.g., states 4 and 5. Characterizing the data channels in DoF terms allows for appropriate account to be taken of the differing spectral widths of channels (and unused or free spectrum) especially in a flexgrid implementation. As would be expected, each DoF of the optical spectrum affects the overall entropy behavior of the optical spectrum.

Each block contains $D_i$ DoFs, where $D_i=C_i/Q_i$, and $Q_i$ represents the spectral width of the particular modulation format Q={q, 10G, 40G, 100G, etc.} present in that particular block. The total number of DoFs in the system is D, where $D=\Sigma_{i=1}^{N}D_i$. The probability of a quantum of optical spectrum being in the $i^{th}$ data block is $p'_i=C_i/P$. However, rather than using this probability quantity which essentially depends only on P (i.e. the total number of resource requirement quanta q in the optical spectrum), the fragmentation of the orderings of the D DoFs of the system holds greater interest, where in general D≤P (equality is only achieved for a completely unused optical spectrum). The probability that any DoF lies within the $i^{th}$ block is $p_i=D_i/D$.

The overall fragmentation entropy of the optical link is therefore given by:

$$H_{frag} = -\sum_{i=1}^{N} \frac{D_i}{D}\ln\frac{D_i}{D} \quad (2)$$

where D is the total number of DoFs present at that time across the spectrum band and $D_i$ is the number of DoFs in the $i^{th}$ block of used or unused spectrum. This formula provides a highly versatile and usable measure of resource fragmentation entropy and topological complexity, which gives system or network owners or operators information allowing for e.g. defragmentation or other maintenance activity to be carried out on the system. In particular, the metric can be used to make routing and wavelength assignment decisions, as will be discussed below. The metric can be obtained on the unused section of the spectrum, the used section, or both.

As previously observed, the spectrum of an optical fiber is deemed to be completely unfragmented (i.e. with minimum topological complexity) where the spectrum is completely unfilled, or else completely filled to capacity with exactly the same sized channels (e.g. all 10G signals). When the optical frequency space of such an unfragmented spectrum is transformed into and viewed as a state distribution: in the first, completely unfilled, case there is just one state (i.e. unfilled) available with an associated probability $p_1=1$, such that the fragmentation entropy is $H_{frag}=0$. Likewise, where the spectrum is completely full (e.g. with only 10G channels), after transforming into the state distribution we yield a single state (i.e. 10G in this case) again with a probability $p_1=1$, and associated fragmentation entropy of $H_{frag}=0$. Hence, the entropy-based fragmentation entropy metric can have an absolute minimum value of zero. A relative fragmentation entropy measure $h_{frag}$ can also be defined, relative to the minimum possible entropy $H_{min}$ for a given fill-factor f. This is given by:

$$h_{frag} = \frac{H_{frag}}{H_{min}} - 1 \quad (3)$$

and is zero for the maximally unfragmented case and with minimum topological complexity.

In summary, an entropy metric can be calculated by considering the optical spectrum in terms of a number of slots representing the individual flexgrid quanta. These can then be grouped into N contiguous blocks consisting of either used (coming from any number of individual signals) or unused spectrum. The Shannon entropy metric $H_{Frag}$ of a spectrum can then be calculated using the formula (2) noted above. Large values of $H_{Frag}$ indicate higher levels of fragmentation.

The entropy levels of the spectrum resources shown in FIG. 2 have been calculated using this approach. The first (top-most) example shows a completely unused spectrum which has a $H_{Frag}$ value of zero; as expected, a completely filled spectrum would also have a fragmentation metric of zero. The remaining examples show that for the same amount of free spectrum (represented by an equal number of filled and unfilled slots), the value of $H_{Frag}$ varies (and increases monotonically) depending on the amount of fragmentation, which reaches a maximum in the last example comprising alternating filled and unfilled slots. One advantage of this approach is that longer contiguous blocks of used or unused spectrum, which are more useful for accommodating future demands, tend to result in lower overall fragmentation entropy levels, An example to demonstrate and discuss how the entropy levels are calculated will now be discussed in connection with FIGS. 3 to 5 to illustrate the application of the above general principles.

Figure 3:
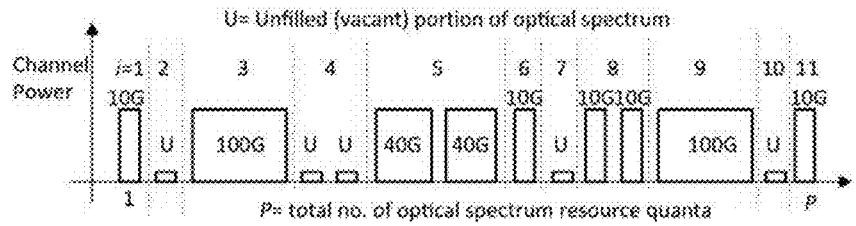
FIG. 3 depicts the optical frequency space of a fragmented optical spectrum.

FIG. 3 depicts an example of an optical spectrum partly filled with data channels of differing bandwidths. The y-axis depicts channel power, while the x-axis is a representation of the spectrum resource. In this illustration, there are N=11 available blocks (i.e. representing 11 states) for this particular spectrum configuration. Here, block or state 1 comprises a 10G data channel, block 2 is "unused" (U) spectrum, block 3 comprises a 100G data channel, block 4 comprises 2 unused quanta of spectrum, and so on. The resource is fragmented in that it comprises used sections as well as unfilled sections. Each channel (U (or q), 10G, 40G or 100G, etc.) is considered to be a single DoF and can be a state in itself (e.g. blocks 1, 2, 3, 6, 7, 9, 10, 11). In FIG. 3, each DoF is depicted along the linear x-axis, so 2 instances of repeating or adjoining 10G channels can be seen in state 8, for example. Multiple consecutive (contiguous) channels can collectively constitute a single state if they are of the same kind or bandwidth (blocks 4, 5, 8). In the example of FIG. 3 therefore, there are a total of D=14 separate channels/quanta or DoFs.

Figure 4:
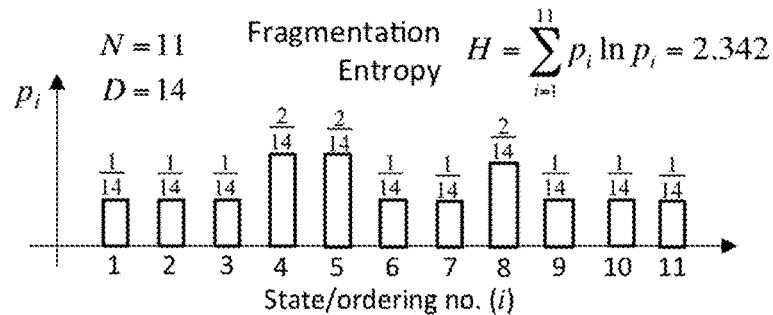
FIG. 4 depicts the results of the transformation of the optical frequency space shown in FIG. 3 into a state distribution space.
Figure 5:
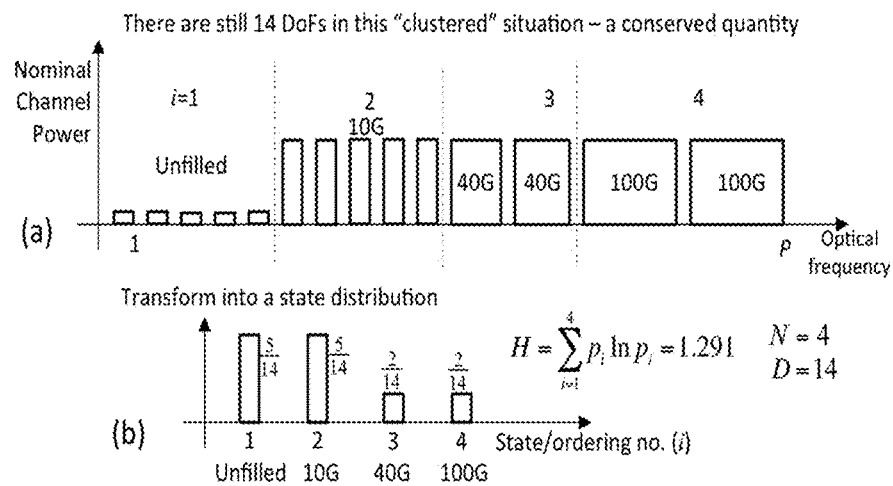
FIGS. 5(a) and 5(b) respectively represent an unfragmented and ordered optical spectrum, and the associated transformed state space.

FIG. 4 depicts the optical frequency spectral distribution of the example shown in FIG. 3 in terms of its state-space distribution. As previously noted, the number of states is N=11 and the number of DoFs is D=14. Each state 1 to 11 is again depicted along the x-axis. In contrast with FIG. 3 however, the channels within the states are represented in terms of its DoFs, so for example there is in state 2, 1 DoF (out of a total of 14 DoFs), while in state 4 there are 2 DoFs (out of a total of 14 DoFs). The height of each bar in each state graphically represents the number of DoFs in each state (so the bar in state 4 is twice the height of that in state 2), which is numerically confirmed by the figures appearing above each bar (1/14 and 2/14 respectively in states 2 and 4). In "transforming" the view of the spectrum resource from the optical frequency view of FIG. 3 to the state-space view in FIG. 4, it is irrelevant whether the channels are arranged from left to right, or vice-versa.

By applying the above-mentioned Shannon formula $H=-\Sigma_{i=1}^{N} p_i \ln p_i$, it can be calculated that the fragmentation metric of the spectrum shown in FIG. 3 is $H_{frag}=2.342$.

It may be expected that an unfragmented resource would yield a lower entropy value. This can be demonstrated by reference to the example shown in FIGS. 5(a) and (b), in which FIG. 5(a) depicts the optical frequency of a set of data channels identical to those shown in FIG. 3, which are arranged, however, so that the DoFs (which in total remains unchanged at D=14) are clustered together in a maximally unfragmented state. Referring to the 10G channels for example, while they previously occupied states 1, 6, 8 and 11 (in FIG. 3), they now are arranged contiguously to form a single block in state 2. The other channels are similarly treated, so that the 14 DoFs are now distributed across the N=4 states (i.e. Unfilled in state 1, 10G in state 2, 40G in state 3, and 100G in state 4), which may be compared with the D=14 states in FIG. 3. As a result, there are only N=4 states in FIG. 5(a).

FIG. 5(b) depicts the state-space distribution of that shown in FIG. 5(a) with associated probability amplitudes, and the overall fragmentation entropy can be calculated to give an entropy value of $H_{frag}=1.291$. The entropy-based fragmentation metric thus offers an objective means to ascertain the degree of fragmentation present in an optical link, and as the metric is monotonic, the higher $H_{frag}=2.342$ entropy value from the example shown in FIG. 3 clearly demonstrates that resource to be more fragmented than the more ordered configuration of FIG. 5(a) which has a lower entropy measure $H_{frag}=1.291$.

The fact that the fragmentation metric is monotonic makes it useful when considering the relative topological complexity of a fragmented spectrum. A monotonic metric offers a measure of the degree of fragmentation and topological complexity of a particular spectrum configuration. So for example, even for the case of FIG. 3 and FIG. 5(a) where the fill-factor (i.e. spectrum capacity utilization) is the same for both cases, the lower fragmentation metric for FIG. 5(a) confirms what we can visually ascertain as its lower fragmentation, and its relatively more simple topological-complexity. Although not shown as a figure, if the used spectrum channels of FIG. 5(a) were actually all identical, e.g. only 10G channels, (i.e. still the same fill-factor as for FIG. 3 and FIG. 5(a)) then the associated fragmentation entropy can be calculated using $H_{min}$, and found to be $H_{frag}=0.389$. This is again much lower than the fragmentation entropy of FIG. 5(a) and confirms that it is essentially less fragmented than FIG. 5(a), due to its lower topological complexity.

This finding is confirmed when viewing the spectrum resource entropy in terms of its fill-factor. Referring back to the example in FIG. 5(a) and assuming for simplicity, quantum q=10 GHz so that the channel bandwidths are given by 10G≡q, 40G≡4q, 100G≡10q, the total available spectrum is P=38q, following from the existence of 38 spectral resource quanta (5×unfilled+5×10G+2×40G+2×100G). With 5 unfilled slots, the fill-factor in this case is f=33/38=86.8%. The minimum fragmentation entropy for such a fill-factor is $H_{min}=0.389$, but it can be noted that the total number of DoFs is now D=38. Likewise, for the case with the same fill-factor f=86.8% as is the case for the previous examples, but for an even more ordered, minimally low topological complexity situation of only one type of modulation format (e.g. 10G, so that there are 33×10G essentially indistinguishable contiguous channels), then the fragmentation entropy reduces further to $H_{frag}=0.389$, equal to $H_{min}$.

The above approach to derive the entropy metric is essentially scale-less (due to its logarithmic nature) and therefore can be applied in sub-networks, national, and pan-national networks in a naturally additive fashion. Usefully, additionally because of its monotonic behavior, it enables measurements of the fine differences between the performances of different defragmentation and RSA algorithms, and achieve optimum network resource exploitation. Furthermore, a link RSA having both local and global properties (e.g. modifying the spectral allocations of a local link will have global implications across the network), the entropic approach to measuring the state of disorder of links in a photonic network is analogous to measuring the entropy of a gas of particles, where each particle exhibits both local and global properties (i.e. a particle has a statistical distribution of short-range to long-range interactions/collisions with the other particles in the gas.) Hence, use of a local link fragmentation entropy also offers insights into a means to optimize the overall dynamic equilibrium performance of a photonic network.

Entropy-Based Optical Routing

Apparatus and methods based on use of an entropy metric which may be obtained in the manner described above, will now be discussed in relation to making routing decisions within an optical network, as an example of how such metrics may be used. Making routing decisions based on, at least in part, spectrum entropy levels especially in flexgrid-based systems, will help address issues which will arise as traffic levels increase, and could help maintain or even reduce spectrum fragmentation over time. This could reduce the need for network operators to carry out spectrum defragmentation activities which would cause delay and disruption to traffic flows.

In particular, the entropy metrics derived from the Shannon-based approach described in the previous section can be applied to routing issues in at least two ways. The first method is based on a "link-based" minimized entropy measure (MinEnt) where the spectrum of each link along a particular path is considered in isolation. The second way it can be applied is a "path-based" MinEnt where the spectrum profiles along all the links in the path are combined together to form a single end-to-end profile. These two applications will be discussed in greater detail below.

Generally, optical system owners or operators currently use network Routing and Wavelength Assignment (RWA) and/or Routing and Spectrum Assignment (RSA) algorithms in their network management systems (NMS) to find pathways through an optical network. In the classical RSA approach, the process comprises two separate steps: first, a route across the network is chosen following a shortest distance or minimum hops algorithm; and then a first fit algorithm is used to select the first free end-to-end wavelength block that can be found. The following pseudo code illustrates the approach:

```
ClassicalRouteAndAssignDemand(Network, Source, Dest, Width)
    PathCandidates = MultiShortestPaths (Network, Source, Dest)
    if no PathCandidates found then return and block Demand
    for each Path in PathCandidates in ascending order
        Spectrum = GetPathSpectrum(Network, Path)
        for each Slot in Spectrum
            TxProfile = GetTxSpectrum(Slot, Width)
            if SpectrumFree(Spectrum, TxProfile) then
                return and allocate Demand <Path, Slot>
            end if
        next Slot
    next Path
    return and block Demand
```

Embodiments and implementations discussed herein seek to include entropy measures into routing and spectrum assignment decisions to find a routing and spectrum assignment that minimizes entropy. This is achieved by use of an algorithm which assigns routes and spectrum by allotting the smallest slot which can accommodate the particular demand, in order to keep larger (contiguous) blocks of spectrum free, and/or for larger demands that need it. In this way, demands of narrower spectral width are not assigned to a large slot where a narrower but suitable slot is available, thus reducing the creation of unused sections next to the newly-occupied slot and allowing for a higher number of demands of various sizes to be supported by making better use of the spectrum.

The entropy measure routine could be based on the approach described above using a version of e.g. formula (2) described above to obtain the $H_{Frag}$ value. In this approach, the entropy value is calculated only for the unused spectral components of a given optical spectrum by finding each block of unused spectrum and calculating the following:

(number_of_unused_slots/total_slots_across_spectrum)*LN(number_of_unused_slots/total_slots_across_spectrum)

where LN is the natural logarithm, and the "total_slots" is equal to the total number of spectrum slots (unused and used) across the whole spectrum band. This calculation is repeated for each block of unused spectrum and added together to get an overall calculation of the fragmentation entropy. It should be noted that a "slot" is deemed to be equivalent to a quantum q of spectrum, so that total slots across the spectrum is P as previously defined, and the number of unused slots is U where the total unused spectrum is therefore Uq. This can provide a usefully-quick (i.e. a less algorithmically complex) approximation to the fragmentation entropy of equation (2).

Figure 6:
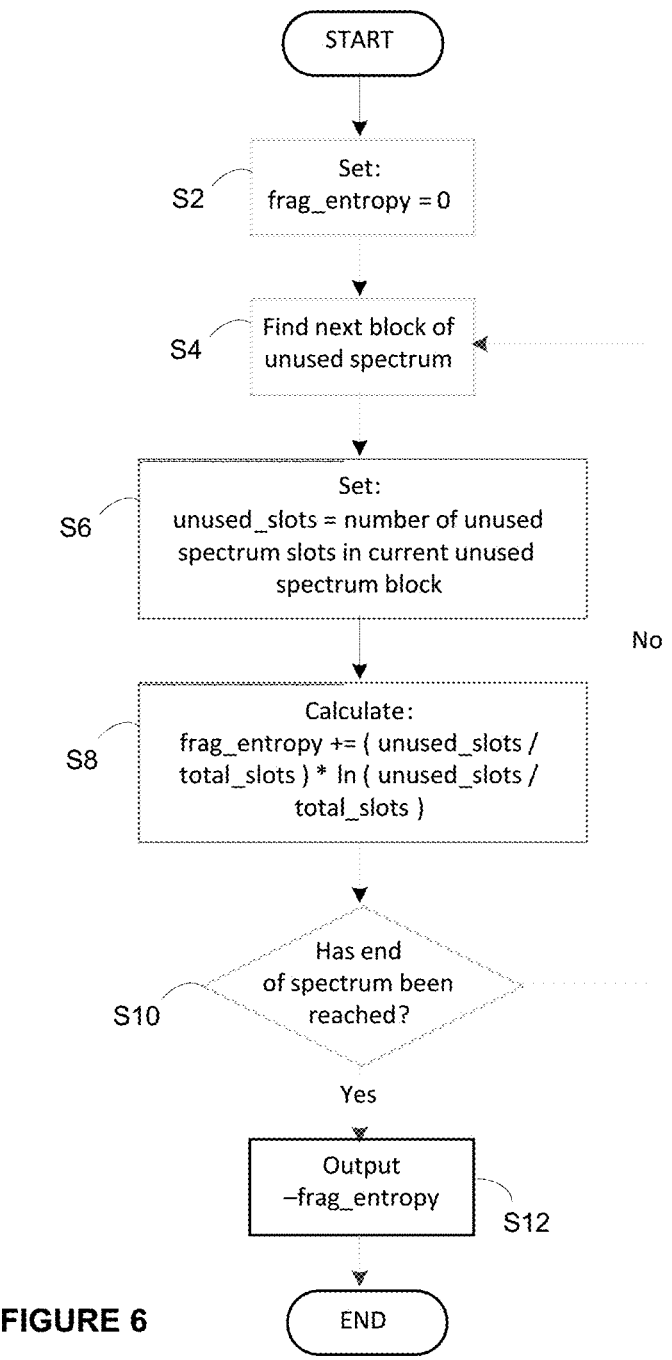
FIG. 6 depicts the process flow for calculating a fragmentation entropy measure.

The flow chart of FIG. 6 depicts the tasks involved in calculating the entropy measure of a given spectrum resource, in which the process begins by setting the entropy value ("frag_entropy") to zero (S2). A block of unused spectrum is found (S4) and the number of unused slots ("unused_slots") discovered up to that point is recorded (S6). The fragmentation entropy level for the unused spectrum block under consideration is calculated using the above formula (S8). If there are still unused blocks to be processed (S10), the tasks are iterated until all the blocks in the spectrum have been processed, at which point the entropy metric is obtained (S12) by adding together all the entropy level values of each unused spectrum block to get an overall calculation of the unused-spectrum fragmentation entropy.

In pseudo code terms, the approach can be expressed thus:

```
CalcFragEntropy(Spectrum)
    TotalSlots = count of number of slots in Spectrum
    Entropy = 0
    for each UnusedBlock in Spectrum
        UnusedSlots = count of number of slots in UnusedBlock
        Entropy = Entropy + UnusedSlots / TotalSlots * ln(UnusedSlots/
            TotalSlots)
    next block
    return -Entropy
```

Figure 7A:
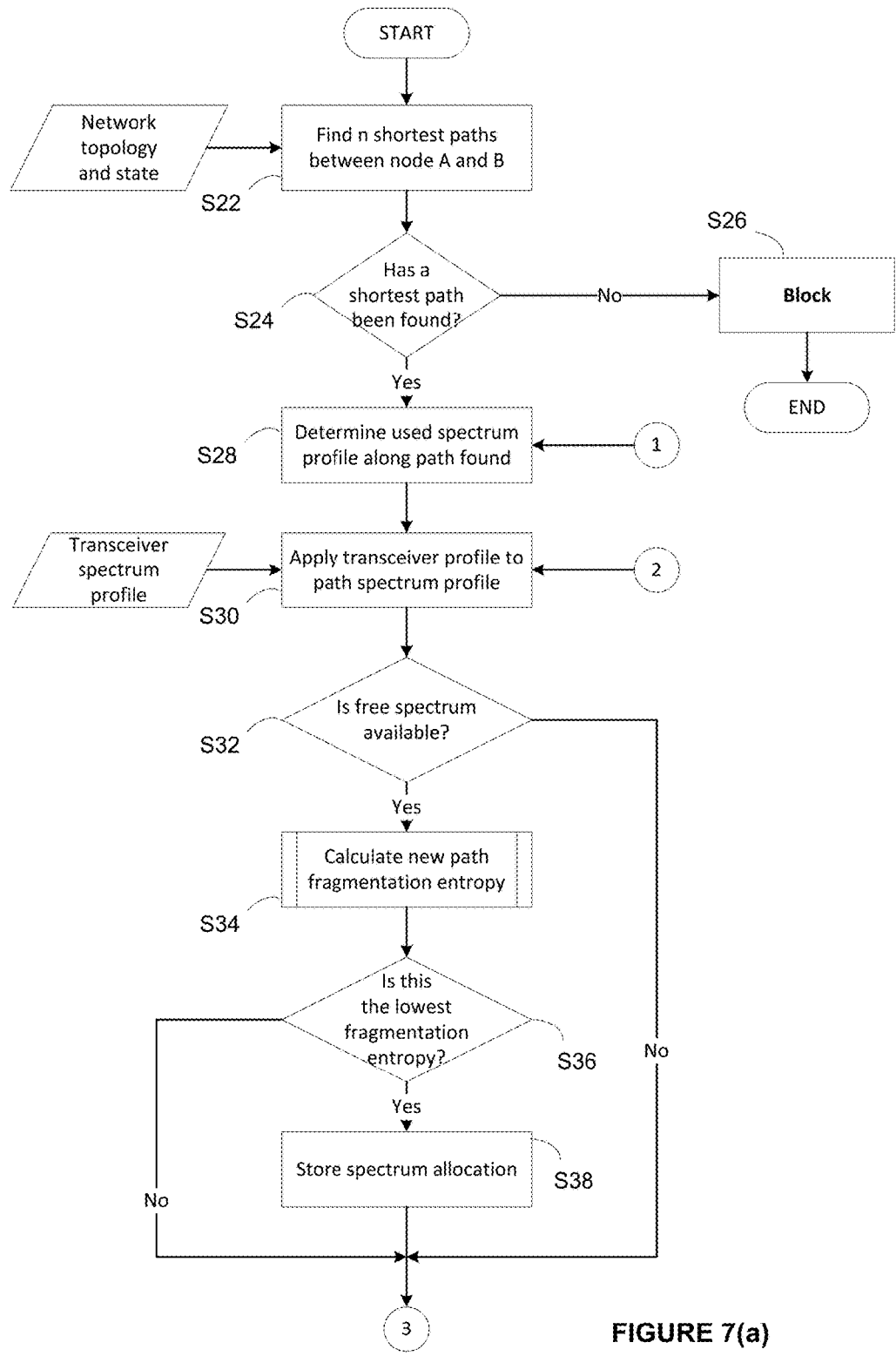
FIGS. 7(a) and 7(b) together depict the process flow in a routing and spectrum assignment process of an embodiment.
Figure 7B:
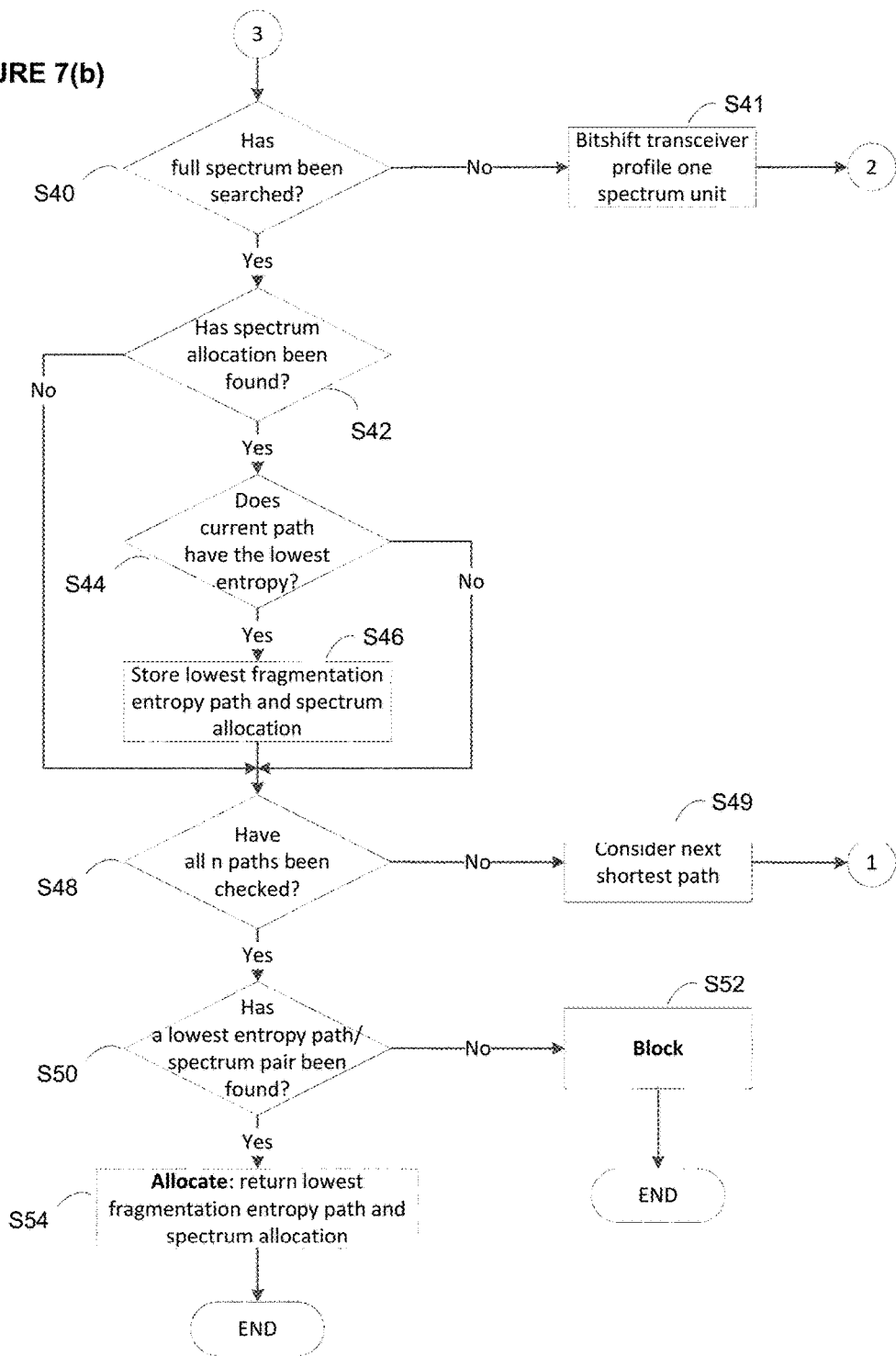

The obtained entropy measure sits at the heart of the routing process described in the flow chart set out in FIGS. 7(a) and 7(b). In brief, the approach involves the finding of a route though the optical network which has the lowest unused-spectrum fragmentation entropy, which is achieved by replacing the conventional lowest-cost path algorithm with a fragmentation entropy metric obtained by the exemplary method shown in FIG. 6. This requires the used spectrum state of each branch of the network to be stored and the spectrum of each additional hop under consideration needs to be added to these states. The fragmentation entropy of the spectrum is calculated using the formula given above. Generally speaking, discovery of the path with the lowest unused-spectrum fragmentation entropy path allows the network owner or operator to select a spectrum allocation which reduces the level of end-to-end fragmentation entropy along the chosen path, or else causes the fragmentation entropy to increase by the smallest amount. To accomplish this, the spectrum required for the transceiver is placed in every position along the entire spectrum. If for a given position the spectrum is currently unused, then the fragmentation entropy is calculated as set out in the flow chart of FIG. 6. The lowest unused-spectrum fragmentation entropy state is stored. Once identified, the routing and spectrum assignment is output to the NMS to be configured on the network nodes. As the skilled person would appreciate, a number of variations can be made to the implementations discussed here: for example, the two steps (of identifying and applying the entropy metric) can be more tightly coupled to form a single step, which might require additional computational time and resources. In any event, it can be expected that routing traffic in this manner would realize a network having an overall lower entropy measure, which will allow for bigger sections to remain available allowing for accommodation of future demands.

Turning now to the exemplary process shown in the flow chart of FIG. 6: at the start of the process, information about the topology and state of the network is used to find a number n of paths between source A and destination B (S22) using conventional methods, e.g., based on Dijkstra's algorithm. Where no path is found (S24) (e.g. there is no discoverable path to the destination node B), the process is blocked (S26) and terminates. If a path is available, the shortest path is selected and the used spectrum profile of that path determined (S28). At this point, the profile of the transceiver device (which is carrying the traffic between source and destination) is applied to the path spectrum profile (S30) at a first location along the spectrum profile. If a section of free spectrum is found (S32, which includes the routine set out in FIG. 6), the fragmentation entropy of the newly-identified path is calculated (S34). A comparison is then made of the entropy levels of the latest-discovered path with any previously-discovered paths based on the spectrum configuration that would result from using the latest-discovered path (S36), and the spectrum allocation in question is stored (S38). The transceiver profile is now along by one slot to allow further placements along the spectrum to be checked (S41). When the spectrum has been fully searched (S40) and the lowest entropy allocation for this spectrum has been found for this new demand along the current considered path (S42), a comparison with previously-discovered paths is made to determine if the latest-discovered path has the lowest entropy rating (S44). If it does, the path and spectrum allocation is stored (S46). The tasks to find the path with the lowest entropy value are iterated until all n paths initially identified at S22 have been checked (S48 and S49). If no spectrum and path combination to the destination node B has been identified, the process is blocked (S52) and terminates. Otherwise, the path and spectrum allocation generating the least entropy in the spectrum resource is selected (S50 and S54), which seeks to guard against "waste" of the spectrum, e.g., avoid placing new demands within a large unused slot when narrower but suitable slots are also available.

As noted above, the obtained entropy metric can be applied to RWAs and RSAs in at least two ways. The flow charts of FIGS. 6 and 7 allude to these methods, which will now be described in detail.

Entropy-Based Optical Routing: (i) Link-Based Measure

In the "link-based" approach based on minimized entropy level, the spectrum of each link or hop (i.e. between nodes) along a particular path is considered separately from each of the spectrums of the other links along the path. Specifically, the spectrum profile of each link is searched to find starting locations with enough free spectrum slots to support the transceiver's spectral width. For each available position, the change in the entropy levels of a spectrum in which the new signal is placed, is calculated. All other slots or positions which have insufficient spectral capacity, are ascribed an infinite delta (or change in entropy). This is repeated for the remaining links in the path and the sum of entropy deltas taken. The frequency slot with the lowest sum of entropy deltas is then selected.

The concept can be illustrated in pseudo code as follows:

```
MinEntLinkRouteAndAssignDemand(Network, Source, Dest, Width)
    PathCandidates = MultiShortestPaths(Network, Source, Dest)
    if no PathCandidates found then return and block Demand
    LowestEntropyDelta = infinity
    BestPath = null
    BestSlot = null
    for each Path in PathCandidates in ascending order
        EntropyDeltas[ ] = infinity
        for each Link in Path
            Spectrum = GetSpectrum(Network, Link)
            OrginalEntropy = CalcFragEntropy(Spectrum)
            for each Slot in Spectrum
                TxProfile = GetTxSpectrum(Slot, Width)
                if SpectrumFree(Spectrum, TxProfile) then
                    TempSpectrum = Combine(Spectrum, TxProfile)
                    NewEntropy = CalcFragEntropy(TempSpectrum)
                    EntropyDelta = NewEntropy – OriginalEntropy
                    EntropyDeltas[Slot] = EntropyDeltas[Slot] +
                    EntropyDelta
                else
                    EntropyDeltas[Slot] = infinity
                end if
            next Slot
        end if
        for each Slot in EntropyDeltas
            if EntropyDeltas[Slot] < LowestEntropyDelta then
                LowestEntropyDelta = EntropyDeltas[Slot]
                BestPath = Path
                BestSlot = Slot
            end if
        next Slot
    next Path
    if LowestEntropyDelta = infinity then
        return and block Demand
    else
        return and allocate Demand <BestPath, BestSlot>
    end if
```

In a worked example illustrating the above, FIG. 8(a) depicts a path comprising 4 links (S1 to S4) with 16 frequency slots (f1 to f16) along the spectra of each link. Again, the empty boxes depict unfilled slots and black boxes depicted filled slots, so it can be seen that all the spectra are fragmented to varying degrees. End-to-end paths for single-slot demands are available through all 4 links in slots f5, f6, f8, f9, f11, f12 and f13. In this example however, a new demand requiring 2 slots needs to be placed on the path, for which there is end-to-end path availability in slots f5, f8, f11 and f12. The values in the boxes show the entropy change or delta ($\Delta H_{frag}$) if the new demand is placed starting at that location. These are obtained using the entropy calculation method described above for each link. Referring to link S1 as an example, slot f4 has an available slot next to it (slot f5) and so can accommodate a 2-slot demand. If it takes on the demand, the entropy delta value is –0.141. Slot f5 has identical characteristics, and so will also have an entropy delta value of –0.141 if it takes on the demand. Slot f7 is occupied, and so slot f6 has no capacity to take on a 2-slot demand, and so its change value is infinity. The values in the line Sum($\Delta H_{frag}$) shows the overall delta values for the end-to-end path in each available slot across all 4 links. Slot f8 yields the lowest overall (summed) MinEnt value of –0.742, and so according to exemplary implementation of the invention, the best choice would be to place the new signal in slot f8.

In brief, the method can be summed up in the following tasks:
(i) identifying a plurality of paths between a source node and a destination node,
(ii) selecting one of the plurality of identified paths,
(iii) defining a new demand as occupying one or more adjacent wavelength channels, (iv) selecting one of the plurality of possible new demand placements from the free spectrum available in the spectrum band on the selected path between the source node and the destination node, temporarily allocating it within the spectrum band, (v) defining within the spectrum band of the selected path one or more blocks of spectral resource, in which each block comprises of one or more adjacent used or unused wavelength channels, (vi) obtaining an entropy value of the selected path defining the spectrum fragmentation across its spectrum band, based on a logarithm of the ratio of the number of wavelength channels in each of the one or more blocks, to the total number of wavelength channels across the spectrum band, (vii) iterating (iv) to (vii) until the entropy value of each of the available demand placements has been determined, (viii) iterating (ii) to (viii) until the entropy value of each of the plurality of identified paths has been determined, and (ix) choosing from the plurality of identified paths and demand placements a path and wavelength assignment having the lowest entropy.

Entropy-Based Optical Routing: (ii) Path-Based Measure

The second way entropy measures can be applied in routing decisions is based on a path-based MinEnt value, where the spectrum profiles along all the links in the path are combined together to form a single end-to-end profile which is then searched to find the spectrum allocation that produces the smallest entropy delta.

The following pseudo code describes the idea behind the path-based approach:

```
MinEntPathRouteAndAssignDemand(Network, Source, Dest, Width)
    PathCandidates = MultiShortestPaths(Network, Source, Dest)
    if no PathCandidates found then return and block Demand
    LowestEntropyDelta = infinity
    BestPath = null
    BestSlot = null
    for each Path in PathCandidates in ascending order
        Spectrum = GetPathSpectrum(Network, Path)
        OrginalEntropy = CalcFragEntropy(Spectrum)
        for each Slot in Spectrum
            TxProfile = GetTxSpectrum(Slot, Width)
            if SpectrumFree(Spectrum, TxProfile) then
                TempSpectrum = Combine(Spectrum, TxProfile)
                NewEntropy = CalcFragEntropy(TempSpectrum)
                EntropyDelta = NewEntropy − OriginalEntropy
                if EntropyDelta < LowestEntropyDelta then
                    LowestEntropyDelta = EntropyDelta
                    BestPath = Path
                    BestSlot = Slot
                end if
            end if
        next Slot
    next Path
    if LowestEntropyDelta = infinity then
        return and block Demand
    else
        return and allocate Demand <BestPath, BestSlot>
    end if
```

Referring to FIG. 8(b), which is based on the 4-link 16-frequency slot example initially discussed in connection with FIG. 8(a), the approach in which the availability of an end-to-end path through all the links as a preliminary requirement is graphically depicted. Here, the two best slot choices are f5 and f8, both yielding the lowest MinEnt value of −0.311.

This accords with the result of the link-based approach, with the added refinement to the result that of the two preferred slots, placement of the new signal into slot f8 would add less fragmentation to the system. Both schemes can be applied over a number of potential paths between the source and destination node to search for lower entropy routings and wavelength assignments.

Network Evolution Projections

The applicants have performed simulations on a specific network configuration comprising source and destination nodes, to test the usefuless of the two entropy-based routing approaches described above. FIGS. 9 and 10 provide a view of network performance against increasing demand levels over time, and illustrate the different results using the three RSA schemes. The curves shown in FIG. 9 show how the overall unused-spectrum network fragmentation entropy (the sum of the unused-spectrum fragmentation entropies across all network links) evolves as demands are added, in which the average network entropy on the y-axis is plotted against the level of demand on the x-axis. FIG. 10 shows how the overall network utilization (the amount of used spectrum across all links) evolves, and plots the average network fill factor (i.e capacity used, on the y-axis) against demand (on the x-axis). In both graphs, the projections based on the three RSA scheme are depicted for comparative purposes: the link-based MinEnt data is depicted by line (a), the path-based MinEnt data by line (b), and the classical shortest-path routing with first-fit spectrum assignment is indicated by line (c).

Referring now to FIG. 9, which depicts a static based traffic generation simulation wherein traffic is only added and never changed or removed, it can be seen that using the link-based MinEnt scheme (line (a)) can yield a significant improvement in the capacity to absorb increased traffic increase levels, when compared to the classical approach (line (c)). Lower levels of entropy are maintained across the whole network indicating that fragmentation is being minimized. This is to be expected given the algorithm is attempting to obtain the lowest entropy delta across the links. As indicated by curve (b), use of the path-based MinEnt approach generated more entropy than the classical approach, yielding only a limited improvement over the conventional approach only at a high level of demand.

FIG. 10 shows that network utilization of link-based MinEnt schemes initially follows the classical result closely, indicating that similar length routes are being selected by both schemes. At higher levels of demand and traffic levels however, line (a) of the link-based MinEnt spectrum allocation approach gradually diverges from the result of the classical approach, indicating that demands can be allocated even as the classical routing and allocation approach starts to slow down on that front. In the case of the path-based MinEnt scheme, curve (b) shows that its use results in greater overall levels of entropy, but of greater critical importance, results in faster consumption of overall network resource.

Referring back to the worked example shown in FIGS. 8(a) and (b) provides an insight into the poor performance of the path-based MinEnt scheme. The path-based approach combining the spectrum profiles over the four links has hidden the complexity of the underlying spectrums and results in placements at f5 and f8 sharing the same lowest entropy delta. If f5 was selected, it reduces the potential to make use of the larger gaps present on links S1 to S3 in other paths, whereas placement at f8 results in filling in a common spectrum gap and reducing overall fragmentation. Longer paths are also likely to be selected as the number of links in the path is hidden by the spectrum profile combination resulting in higher levels of network utilization. By making use of all the information available, the link-based MinEnt scheme correctly identifies f8 to be the optimum choice.

Figure 11:
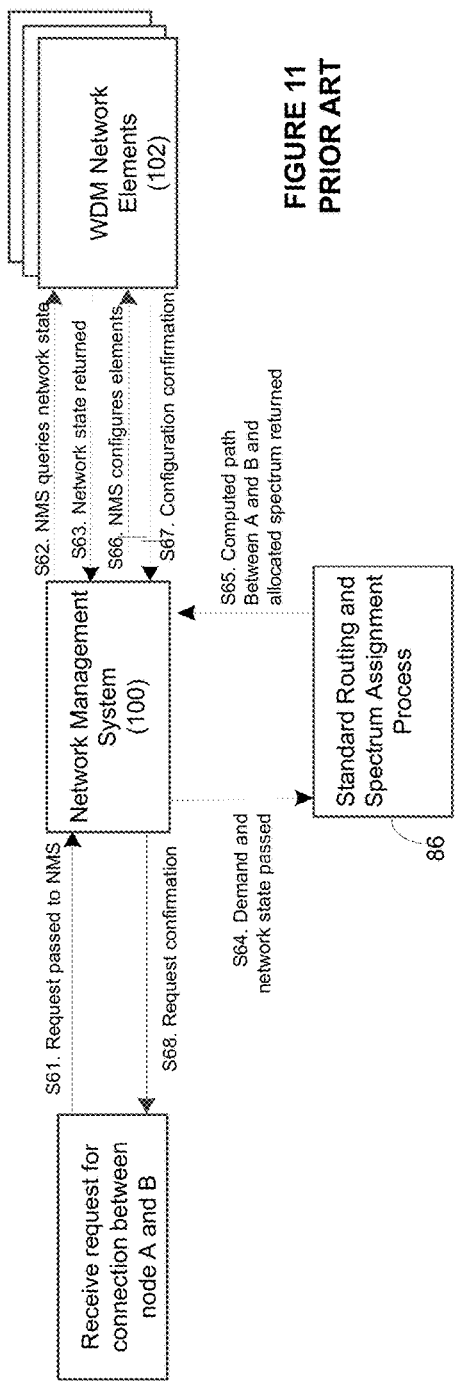
FIG. 11 is a block diagram of network components involved in the routing and spectrum assignment process of the prior art.

Finally, FIG. 11 is a schematic view of the process flows between the network components used in routing and allocation management in a conventional set up. The main functional block is the NMS (100) which sends and receives instructions. The process typically commences with a request for a connection to be made between source node A and destination node B. This request is sent to the NMS (S61), which seeks and obtains data about the network state (S62 and S63). This information is then used to discover a suitable path based on the network state (S64), which according to standard RSA methods (86) would include shortest-path calculations. The identified path is then returned (S65) to the NMS. The WDM transceivers (102) are then configured (S66 and S67) to place the signal along the path identified for that purpose.

Figure 12:
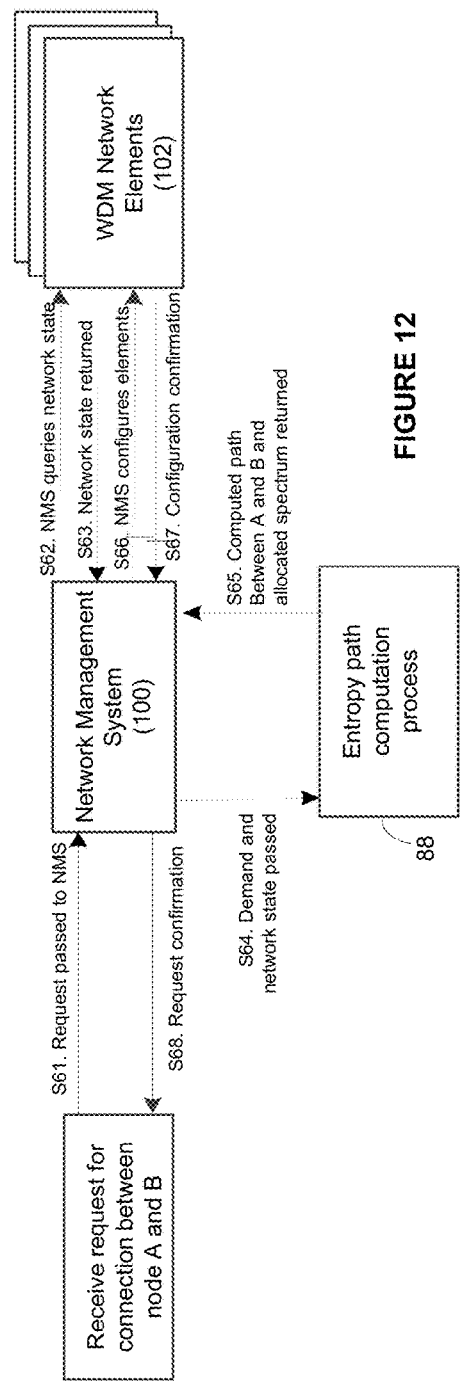
FIG. 12 is a block diagram of network components involved in the routing and spectrum assignment process of an embodiment.

FIG. 12 illustrates the relative ease with which an entropy-based metric can be deployed within the routing system by replacement of the conventional RSA method with a process or routine for calculating the entropy metric of the path or the link as the case may be. The skilled person would appreciate that as an alternative to replacement, the system may include entropy calculations in addition to standard routing decisions, and that both the link- and path-based methods could in suitable cases allow for deeper analyses of the network and identified routes to be carried out before a decision is taken.

The apparatus, methods and configurations described above and in the drawings are for ease of description only and not meant to restrict the scope of the invention to any particular embodiment. For example, it will be apparent to the skilled person that steps can be added or omitted from the methods and processes described herein. While the examples illustrating application of the invention are made in respect of an optical network and in particular in connection with flexgrid-based systems, it would be appreciated that other telecommunications systems as well as non-telecommunications systems can suffer from resource fragmentation as well during use, which could benefit from an analysis of entropy levels. In particular, entropy based fragmentation RSA techniques can also be applied in fixed grid scenarios to select a path and wavelength channel which reuses released channels in the network more optimally than starting to make use of a new wavelength that is currently unused in the network. It would also be appreciated that such entropy measures can be advantageously applied in a variety of situations, not being restricted to use only in respect of identifying network routes.

The invention claimed is:

1. A routing and wavelength assignment method for use in an optical system, comprising:
  (i) in an optical path between a source node and a destination node, selecting a block of spectrum resource comprising one or more adjacent wavelength channels, the block being of a width sufficient to accommodate a demand having a spectral width occupying one or more adjacent wavelength channels, and the optical path comprising a plurality of optical links between the source node and the destination node;
  (ii) calculating an entropy change value (ΔHfrag) that would result from introducing the demand into the block in each link of the optical path;
  (iii) summing, over the plurality of optical links, a total entropy change value for the block;
  (iv) iterating (i), (ii) and (iii) for at least one further block of spectrum resource in the optical path; and
  (v) selecting a block that results in a lowest summed entropy change value.

2. A method according to claim 1, wherein (ii) comprises determining the entropy change value (ΔHfrag) by using a formula:

$$-\sum_{i=1}^{N} \frac{D_i}{D} \ln \frac{D_i}{D}$$

where N is a number of blocks in a spectrum band of the optical path, D is a total number of wavelength channels, ln is the natural logarithm, and $D_i$ is a number of wavelength channels in the $i^{th}$ block.

3. A method according to claim 1, further comprising identifying the optical path through the plurality of optical links.

4. A method according to claim 1, wherein (i) comprises selecting a shortest optical path first.

5. A method according to claim 1, wherein the calculating is further based on information about network states and transceiver profiles.

6. A method according to claim 1, wherein the wavelength channels have arbitrary spectral widths.

7. A network management system enabling routing and wavelength assignment decisions, the system configured to:
  (i) in an optical path between a source node and a destination node, select a block of spectrum resource comprising one or more adjacent wavelength channels, the block being of a width sufficient to accommodate a demand having a spectral width occupying one or more adjacent wavelength channels, and the optical path comprising a plurality of optical links between the source node and the destination node;
  (ii) calculate an entropy change value (ΔHfrag) that would result from introducing the demand into the block in each link of the optical path;
  (iii) sum, over the plurality of optical links, a total entropy change value for the block;
  (iv) iterate (i), (ii) and (iii) for at least one further block of spectrum resource in the optical path; and
  (v) select a block that results in a lowest summed entropy change value.

8. A system according to claim 7, further comprising a transceiver.

9. A non-transitory computer-readable storage medium comprising computer executable code which, when executed on a computer, causes the computer to perform the method of claim 1.

* * * * *